United States Patent
Baker et al.

(10) Patent No.: US 8,254,433 B2
(45) Date of Patent: Aug. 28, 2012

(54) NON-FEDERATED MULTI-FUNCTION KA-BAND EXCITER SYSTEM AND METHOD

(75) Inventors: David W. Baker, Tucson, AZ (US); Joel C. Blumke, Tucson, AZ (US); Ralston S. Robertson, Northridge, CA (US); Chester Lo, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 620 days.

(21) Appl. No.: 12/106,865

(22) Filed: Apr. 21, 2008

(65) Prior Publication Data

US 2009/0323782 A1  Dec. 31, 2009

Related U.S. Application Data

(60) Provisional application No. 61/019,758, filed on Jan. 8, 2008.

(51) Int. Cl.
*H04B 1/38* (2006.01)
*H04L 27/00* (2006.01)

(52) U.S. Cl. .................................. 375/219; 375/295

(58) Field of Classification Search .......... 375/219, 375/295, 308; 342/42; 455/12.1, 118
See application file for complete search history.

(56) References Cited

U.S. PATENT DOCUMENTS

| | | | |
|---|---|---|---|
| 3,350,651 A | 10/1967 | Davis | |
| 4,216,542 A | 8/1980 | Frosch et al. | |
| 4,733,238 A | 3/1988 | Fiden | |
| 5,120,997 A | 6/1992 | Cantwell | |
| 5,418,818 A | 5/1995 | Marchetto et al. | |
| 5,594,939 A * | 1/1997 | Curello et al. | 455/12.1 |
| 5,708,436 A | 1/1998 | Loiz et al. | |
| 6,081,226 A | 6/2000 | Caldwell et al. | |
| 2002/0003488 A1 | 1/2002 | Levin et al. | |
| 2007/0096885 A1 | 5/2007 | Cheng et al. | |
| 2007/0178855 A1 * | 8/2007 | Lo Hine Tong et al. | 455/118 |

OTHER PUBLICATIONS

International Search Report for International Application No. PCT/US2009/041317, filed Apr. 21, 2009, Applicant Raytheon Company, International Search Report dated Oct. 13, 2009 and mailed Oct. 22, 2009 (2 pgs.).

Written Opinion of the International Searching Authority for International Application No. PCT/US2009/041317, filed Apr. 21, 2009, Applicant Raytheon Company, Written Opinion dated Oct. 13, 2009 and mailed Oct. 22, 2009 (7 pgs.).

Extended European Search Report (including Supplementary European Search Report and European Search Opinion) for International Application No. PCT/US2009/041317, filed Apr. 21, 2009, Applicant Raytheon Company, search completed Jul. 11, 2011, date of mailing Jul. 18, 2011 (9 pgs.).

* cited by examiner

*Primary Examiner* — Khanh C Tran

(74) *Attorney, Agent, or Firm* — Christie, Parker & Hale, LLP

(57) ABSTRACT

Provided is a non-federated multi-function exciter. The non-federated multi-function exciter includes a waveform generator subsystem operable to provide waveforms programmable in time, duration, slope and frequency. A transmission subsystem is coupled to the waveform generator, the transmission subsystem having a first upconverter and a second upconverter coupled to the first upconverter. A communication modulation subsystem is coupled to the second upconverter of the transmission subsystem. A reference clock subsystem coupled to the waveform generator subsystem, the transmit subsystem and the communication modulation subsystem. The non-federated multi-function exciter is operable to generate interleaved radar and communication signals.

21 Claims, 5 Drawing Sheets

NON-FEDERATED MULTI-FUNCTION KA-BAND EXCITER SYSTEM AND METHOD

RELATED MATERIALS

This application claims priority to U.S. Provisional Application 61/019,758 filed Jan. 8, 2008, entitled "A Non-Federated Multi-Function KA-Band Exciter System and Method" and incorporated herein by reference.

This invention was made with Government support under contract No. W911QX-04-C-0108 awarded by DARPA/Army Research Laboratory (COTR). The Government has certain rights in this invention.

FIELD

This invention relates generally to the field of signal processors and processing systems in radar and communication systems, and more specifically to a non-federated multi-function Ka-band exciter system.

BACKGROUND

In recent years, the United States military has systematically moved from conventional weaponry to systems and devices using advanced global positioning satellite systems, radar systems and communication systems. Indeed the need for a weapon system or reconnaissance system, whether manned or unmanned, to have communication capabilities is nearly an absolute must.

More and more defense systems are implemented with the use of multiple actors and therefore require communication with a base, if not cross communication while in the field. At high rates of speed, long distances and perhaps even the use of camouflage communication also may be vital to the identification of and distinction between friend and foe. And it is not uncommon for manned and unmanned vehicles to employ many types of radar and communication systems.

In addition, there is an ever increasing realization that customized components are not always cost effective or easily upgraded with new technology. Moreover, radar and communication systems that are readily adaptable for use in different aircraft, and or ground vehicles are likely to enjoy cost savings in production. Systems that can utilize existing interfaces are also more easily installed, replaced and/or upgraded when and as needed.

With respect to moving systems such as aircraft and cruise missiles, weight is an important design factor. Although important, multiple communication and radar systems tend to increase the overall weight of a craft, and therefore either reduce the amount of payload or shielding that that can be carried, or necessitates the use of larger engines. This also factors into increased costs in design and development. Even with ground based systems such as vehicles or systems that are carried by persons themselves, communication systems are vitally important.

In many instances there are common elements between the multiple communication and radar systems, which implies that to some extent the excess weight is redundant weight. Maintenance is also a factor and as the communication systems are vital to device and system performance, routine maintenance is a regular and necessary occurrence. When multiple systems have multiple common elements, the costs of this routine maintenance may be somewhat inflated due to redundant maintenance being performed on similar but separate systems within the same aircraft.

Moreover, the redundant elements necessary to excite the various waveforms used for the communication signals and radar signals affects the cost, size and weight of the system both for its development as well as for its continued use.

Hence, there is a need for a non-federated multi-function exciter that overcomes one or more of the issues and problems identified above.

SUMMARY

This invention provides a non-federated multi-function exciter and associated method of use.

In particular, and by way of example only, according to an embodiment of the present invention, provided is a non-federated multi-function exciter, including: a waveform generator subsystem operable to provide waveforms programmable in time, duration, slope and frequency; a transmission subsystem coupled to the waveform generator, the transmission subsystem having a first upconverter and a second upconverter coupled to the first upconverter; a communication modulation subsystem coupled to the second upconverter of the transmission subsystem; and a reference clock subsystem coupled to the waveform generator subsystem, the transmit subsystem and the communication modulation subsystem.

Moreover, according to yet another embodiment of the present invention, provided is a method of generating interleaved radar and communication signals using a non-federated multi-function exciter, including: determining the transmission operation to be in a first instance a radar format and in a second instance to be a communication format; in the first instance of radar format: generating an oscillating reference waveform using a waveform generator; upconverting the oscillating reference waveform to a Ku-band waveform using a Ku-band PLL subsystem; and upconverting the Ku-band waveform to a Ka-band waveform using a transmission subsystem, and transmitting the generated Ka-band waveform as a radar signal; in the second instance of communication format: parking the waveform generator subsystem at a predetermined frequency to generate a fixed frequency signal; upconverting the fixed frequency signal to a fixed frequency Ku-band signal using the aforementioned Ku-band PLL subsystem; modulating received communication information using a communication modulation subsystem; upconverting the modulated communication information with the fixed frequency Ku-band signal using a transmission subsystem to a modulated Ka-band signal; and transmitting the modulated Ka-band signal as a pulse of communication data, or alternatively in non-pulsed operation as a continuous wave (CW) stream of communication data.

In yet another embodiment, provided is a circuit card assembly, including: a waveform generator subsystem operable to provide waveforms programmable in time, duration, slope and frequency; a transmission subsystem coupled to the waveform generator, the transmission subsystem having a first upconverter and a second upconverter coupled to the first upconverter; a communication modulation subsystem coupled to the second upconverter of the transmission subsystem; and a reference clock subsystem coupled to the waveform generator subsystem, the transmission subsystem and the communication modulation subsystem; wherein the circuit card assembly is operable as a non-federated multi-function exciter.

DETAILED DESCRIPTION

Before proceeding with the detailed description, it is to be appreciated that the present teaching is by way of example only, not by limitation. The concepts herein are not limited to use or application with a specific system or method of a non-federated multifunction exciter. Thus, although the instrumentalities described herein are for the convenience of explanation, shown and described with respect to exemplary embodiments, it will be appreciated that the principles herein may be applied equally in other types of systems and methods involving non-federated multi-function exciters; including but not limited to sensing technologies, for example, pulsed radar, frequency modulated continuous wave (FMCW) radar, and communication technologies such as, for example, pulsed communications, CW communications, datalink, combat identification, etc.

Figure 1:
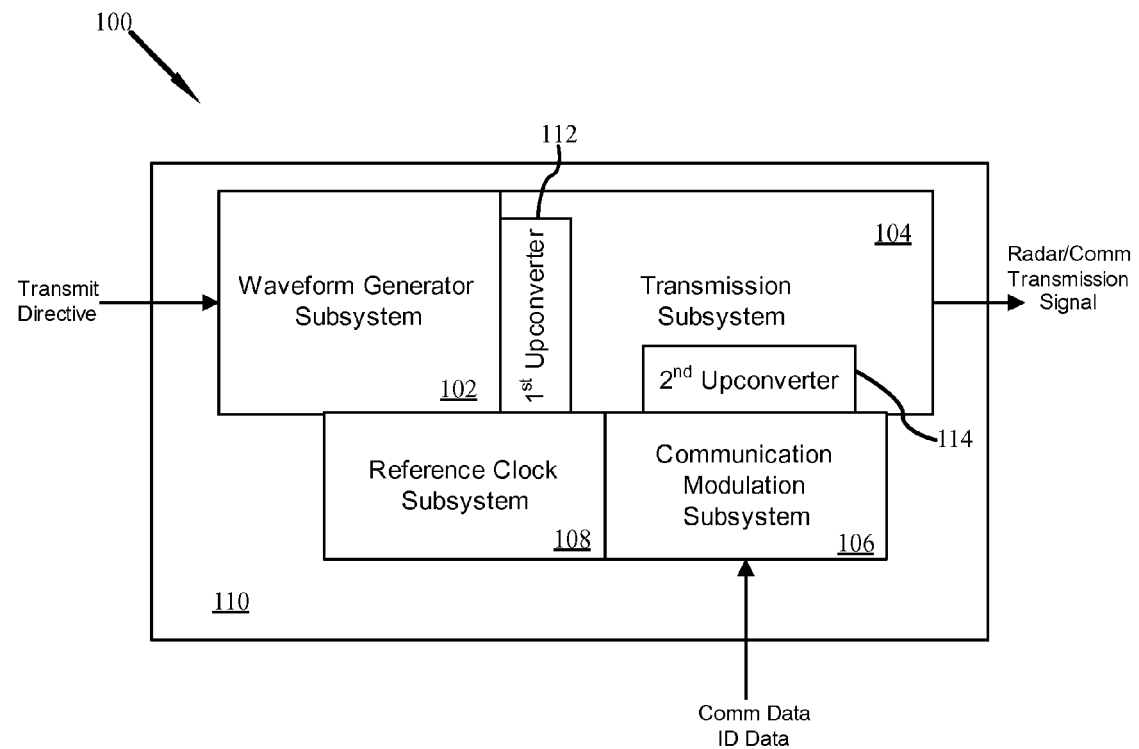
FIG. 1 is a block diagram of a non-federated multi-function exciter in accordance with at least one embodiment.

Turning now to the figures, and more specifically to FIG. 1, there is shown a conceptual block diagram of a non-federated multi-function exciter "NFME" 100 in accordance with at least one embodiment. As shown, NFME 100 is comprised generally of a waveform generator subsystem 102, a transmission subsystem 104, a communication modulation subsystem 106 and a reference clock subsystem 108. In at least one embodiment, all of these components are provided on a single circuit card assembly 110. In at least one embodiment, all of the components are provided in a single modular assembly, which may have multiple internal circuit cards, but which as an assembly is modular in nature and treated as a unitary component. For purposes of this disclosure, a circuit card assemble 110 is understood and appreciated to encompass both a physical single card as well as the unitary component assembly.

As is further discussed below, through the use of an interleaved mode waveform, the NFME 100 can, on a pulse-to-pulse basis, generate a radar pulse or a communications pulse, all with the same set of hardware components. The NFME 100 takes advantage of a combination of direct digital synthesis and indirect frequency synthesis techniques to generate a suitable frequency plan to accommodate both radar and communications bands and contains an integral quadraphase-shift keying module for generating modulated communication or phase coded radar signals for transmission.

In at least one embodiment, the waveform generator 102 is a direct digital synthesis (DDS) waveform generator, and is operable to perform two functions. First, a field programmable gate array (FPGA) within the DDS provides timing and control functions for the DDS subsystem itself as well as for the rest of the NFME 100. Second, the DDS provides programmable waveforms in time, duration, slope and frequency.

As a general overview, the transmission subsystem 104 is coupled to the waveform generator 102 and has a first upconverter 112 (coupled to the waveform generator) and a second upconverter 114. The communication modulation subsystem 106 is coupled to the second upconverter 114 of the transmission subsystem. The reference clock subsystem is coupled to the waveform generator, the transmission subsystem 104 and the communication modulation subsystem 106.

More specifically, in at least one preferred embodiment the waveform generator 102 has a DDS chip featuring a 10-bit digital-to-analog converter (DAC) which operates at up to 1 GSPS and enables fast frequency hopping and fine tuning by employing a 32-bit frequency tuning word. The DDS clock frequency can run up to 1 GHz, providing greater than 300 MHz of useful Linear Frequency Modulation (LFM) bandwidth at the DDS output.

The LFM waveforms are fully programmable in time, duration, slope and starting frequency which permits pre-distortion of the LFM waveform to compensate for phase distortion which may be introduced by the rest of the NFME 100 system. This pre-distortion compensation can be used to improve the radar range sidelobe performance of the generated radar waveform.

The generated waveform output from the waveform generator subsystem 102 is provided to the first upconverter 112. In at least one embodiment, the first upconverter 112 is a Ku-band Phase Lock Loop (PLL) subsystem. As the output waveform from the waveform generator subsystem 102 is generally in a range of about 118~291 MHz, the first upconverter 112 multiplies this to a range of about 17.10~19.85 GHz. Moreover, the first upconverter 112 in at least one embodiment is also operable as a waveform stretcher.

Moreover, with respect to FIG. 1, in at least one embodiment NFME 100 is a circuit card assembly comprising a waveform generator subsystem, a transmission subsystem coupled to the waveform generator and having a first and second upconverter, a communication modulation subsystem coupled to the second upconverter and a reference clock subsystem that is coupled to the waveform generator subsystem, the transmission subsystem and the communication subsystem. In at least one embodiment this circuit card assembly is structured and arranged to comply with the Standard Avionics Module (SAM) format as used in advanced airborne radar platforms.

Figure 2:
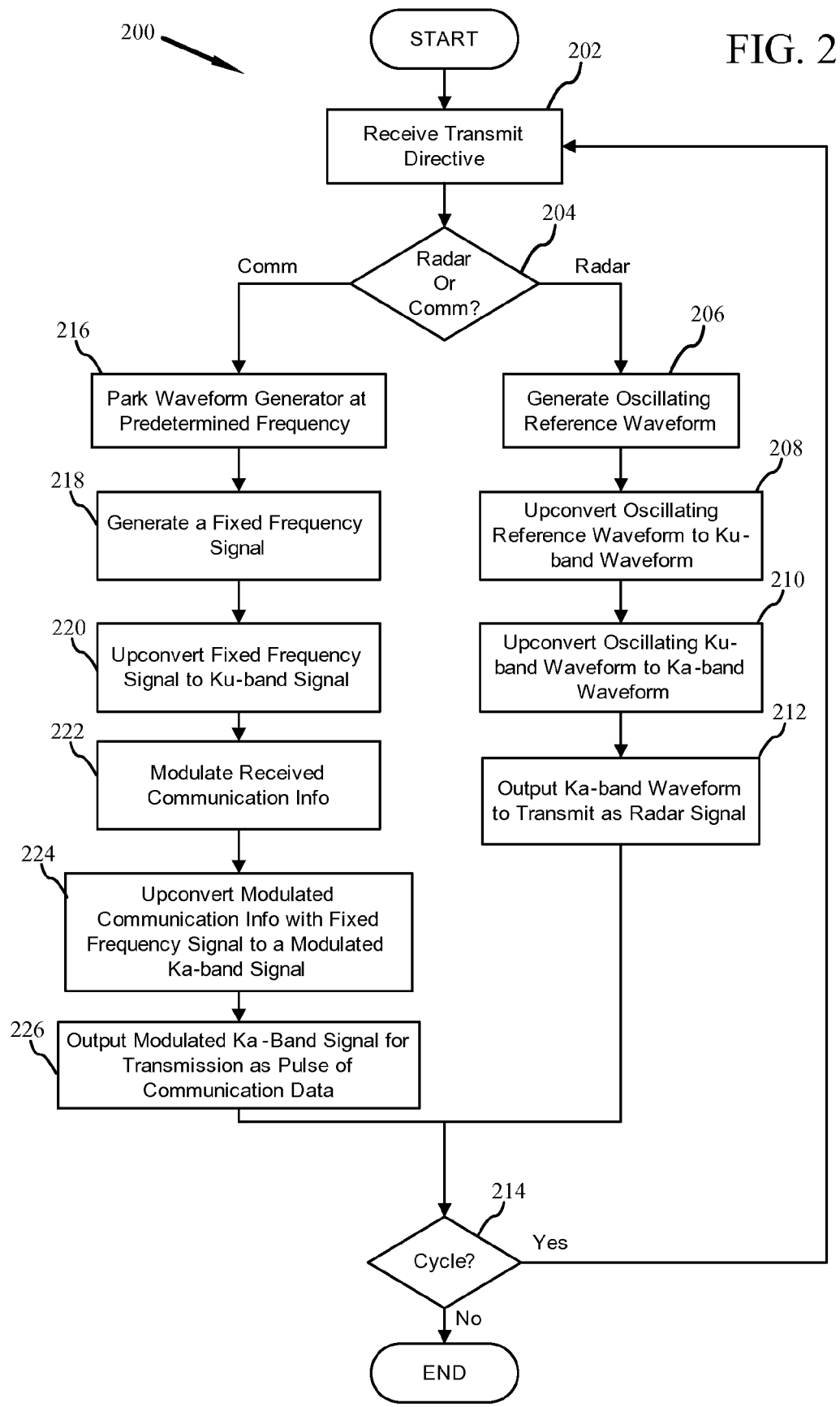
FIG. 2 is a flow diagram for at least one method of operation for the non-federated multi-function exciter as shown in FIG. 1.

As NFME 100 is operable in either a radar format or a communication format, there are two general signal flow paths that may be taken with respect to this upconverted waveform. FIG. 2 conceptually illustrates these two options in at least one method 200 of operation for NFME 100 to interleave radar and communication transmissions. It is of course understood and appreciated that this method need not be presented in the order herein presented, but rather this order is exemplary of at least one embodiment and is presented as shown to facilitate ease of discussion and illustration and not for purposes of limitation.

As shown in FIG. 2, method 200 generally is commenced with NFME 100 receiving a transmit directive, block 202. This directive is reviewed to determine the form of the transmission that is being directed, radar or communication, decision block 204.

In a first instance, radar format, NFME 100 operates to generate an oscillating reference waveform with waveform generator subsystem 102 as described above, block 206. This oscillating reference wave form is upconverted and stretched by the first upconverter 112 to Ku-band, block 208. The upconverted Ku-band waveform is upconverted yet again by the second upconverter 114 to a Ka-band waveform in a range of about 33.4~36 GHz, block 210. This Ka-band waveform is then output by the transmission subsystem 104 as a radar pulse, block 212.

The method 200 then determines if it is still in operation such that it should cycle back to receive yet another transmission directive, decision 214 returning to block 202.

In the second instance, communication format, the waveform generator subsystem 102 is parked at a predetermined frequency that is appropriate for the type of communication to be performed, block 216. At this predetermined frequency a fixed frequency signal is then generated, block 218. This fixed frequency signal is upconverted by the first upconverter 112 as a Ku-band signal, block 220. The communication modulation system 106 receives communication data, such as identification data (and more specifically combat identification data) or data link information, and modulates this received communication data onto a selected channel at a lower frequency, block 222.

This modulated signal is then upconverted by the fixed frequency Ku-band signal and the second upconverter 114 to a Ka-band waveform in the range of about 36.0~38.6 GHz, block 224. This Ka-band signal is then output by the transmission subsystem 106 as a communication pulse, block 226. As in the first instance of radar format, the method 200 then determines if it is still in operation, and cycles back to receive yet another transmission directive if such is the case, decision 214 returning to block 202. It should be noted that in at least one embodiment, NFME 100 can switch operation mode to be a continuous communication system. Although this would preclude the inter-leaving of radar pulses, such continuous communication may at times be desired, and the capability of NFME 100 to switch between pulse and continuous communication may be highly advantageous.

In such a fashion, method 200 permits NFME 100 to inter-leave radar and communication signals through the same device. The generated radar signals are of course established in over the frequency range appropriate for the type of radar operation to be performed. Similarly, the communication signals include the transmission of data information and identification information, such as for example the specific form of combat identification information.

Figure 3:
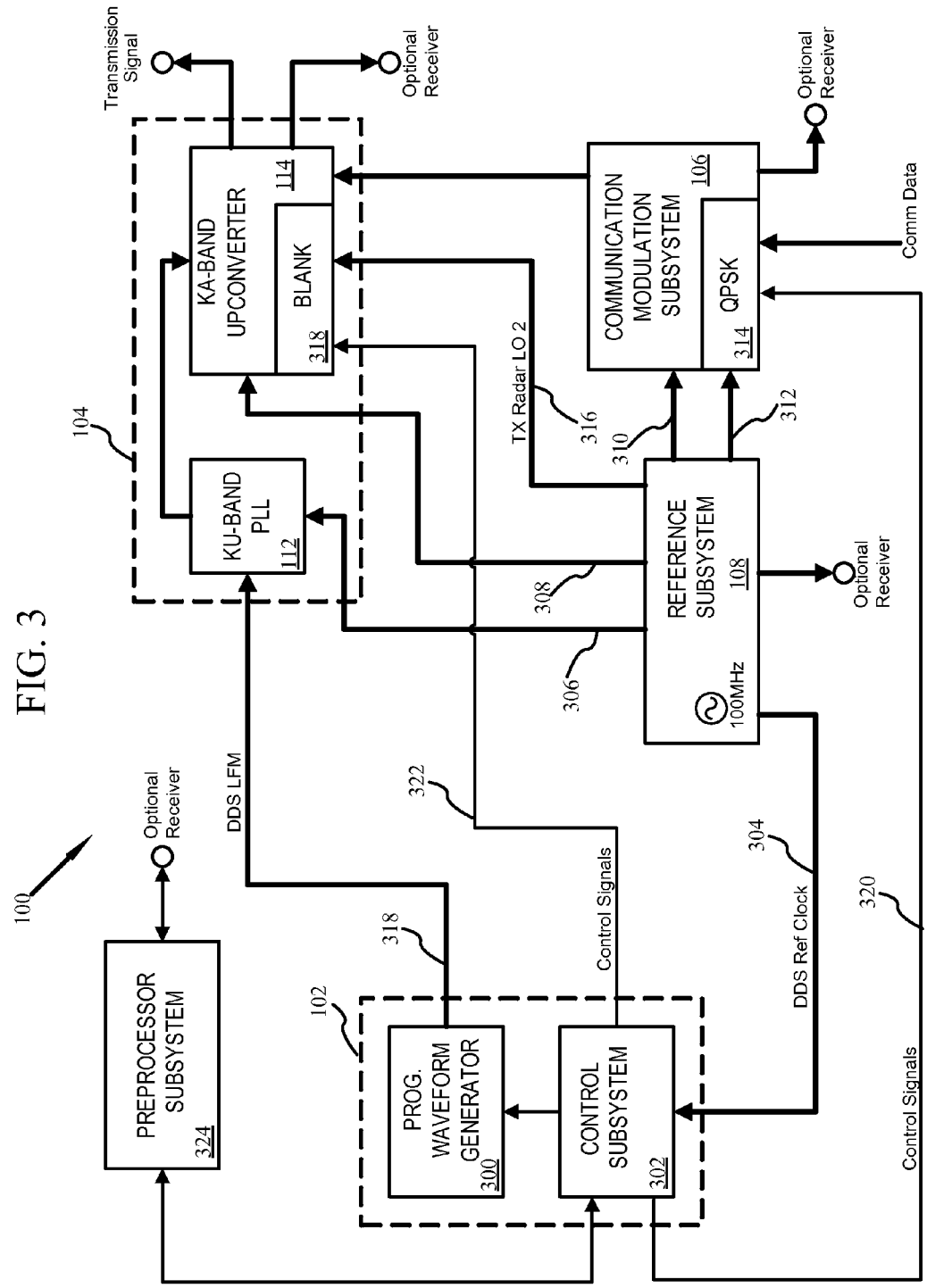
FIG. 3 presents the flow of communication and control for a non-federated multi-function exciter as shown in FIG. 1 in accordance with at least one embodiment.

FIG. 3 presents a schematic illustration further detailing the communication and flow of operations within at least one embodiment of NFME 100 as shown more generally in FIG. 1. More specifically, the waveform generator subsystem 102 is shown to consist of two inner components, the programmable waveform generator 300 and the control subsystem 302.

The reference subsystem 108 includes a crystal oscillator, which in at least one embodiment is a 100 MHz crystal oscillator. In at least one alternative embodiment the reference subsystem 108 includes a crystal oscillator which is a 120 MHz crystal oscillator. The reference system provides a reference clock signal 304 to the waveform generator subsystem 102, a fixed local oscillator frequency signal 306 to the first upconverter 112, and a transmission local oscillator frequency signal 308 to the second upconverter 114. The reference subsystem also provides a communication offset local oscillation signal 310 used in the channel selection phase lock loop and a communication modulation local oscillator frequency signal 312 used as a carrier for the communication modulation subsystem 106.

The communication modulation subsystem 106 includes a quadrature phase-shift keying subsystem 314 for modulating digital signals on to a radio-frequency carrier signal using four phase states to code two digital bits. Moreover, phase-shift keying (PSK) is a digital modulation scheme to convey data by changing or modulating the phase of a reference signal (e.g., the carrier wave). The simplest form of PSK is binary phase-shift keying (BPSK) where the two phases are separated by one hundred eighty degrees. Quadraphase-shift keying (QPSK) uses four phases at ninety degree offsets which permits the encoding at twice the rate of BPSK.

In at least one embodiment, NFME 100 utilizes a QPSK subsystem 314 to provide QPSK for communication information encoding. As the QPSK subsystem 314 is providing four phases, it can be advantageously utilized to emulate a BPSK subsystem and provide bi-phase modulation for the generation of BPSK radar signals, which are also provided by NFME 100 and would apply to another class of radar.

As in at least one embodiment the same antenna structure, not shown, is used to both transmit and receive, it is understood and appreciated that the NFME 100 operates to blank the transmit signal sent to the antenna so as to provide an opportunity for reception. This is especially important with respect to when NFME is operating in radar format. Accordingly, the reference subsystem 108 provides a transmission radar local oscillation signal 316 to the transmit subsystem 104, and more specifically to the blanking subsystem 318 within the transmission subsystem 104. The blanking subsystem 318 is a switch that turns off the signals when blanking is to occur.

With respect to the waveform generator subsystem 102, and the programmable waveform generator 300 specifically, as noted above this waveform generator is in at least one embodiment a direct digital synthesis generator, which is preferable in many situations due to the beneficial ability to characterize the entire system to correct for non-linearities much more easily than with traditional analog generators. However, it is also understood and appreciated that DDS generators may also provide spurs in the generated waveform signal.

As indicated by connection path 318, the output of the waveform generator subsystem 102 is passed to the first upconverter 112. By passing the output of the waveform generator subsystem 102 to the first upconverter and range multiplier 112, e.g., a Ku-band PLL, NFME 100 not only enjoys the first upconversion of the generated signal, but the Ku-band PLL also acts as an active filter which removes the undesired spurs from the generated signal.

As noted above the waveform generator subsystem 102 includes a control subsystem 302. Whereas the reference subsystem 108 provides the 100 MHz oscillation signal that is used by the NFME 100 to synchronize actions of the NFME 100, the control subsystem 302 is operable to direct when an action is to occur. Control subsystem 302 is therefore shown to have communication lines 320 and 322 leading to the transmission subsystem 104 and the communication modulation subsystem 106. Command of the waveform generator subsystem 102, and specifically the control subsystem 302 is overseen in at least one embodiment by the pre-processor system 324, which directs the type of transmission that is to be performed, e.g., radar or communication.

As noted above, when operating in communication format, the communication modulation subsystem 106 receives data for transmission. This data is modulated onto an RF carrier by the QPSK subsystem 314. The modulated RF carrier is upconverted to X band frequency by the communication modulation subsystem 106. This modulated X band signal is upconverted by the second upconverter 114 with the Ku-band fixed frequency signal provided by the first upconverter 112.

Figure 4:
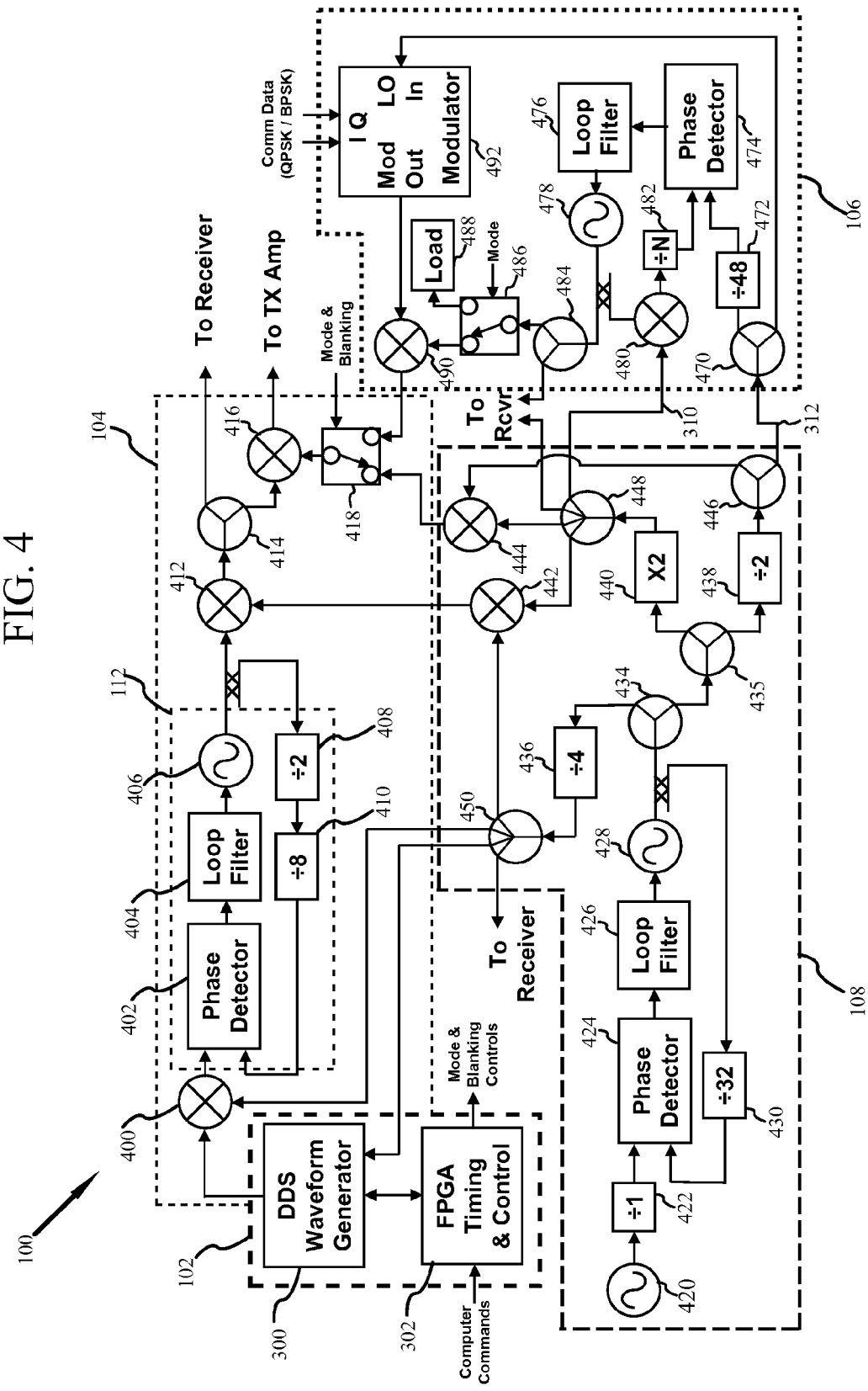
FIG. 4 presents a high level circuit schematic diagram of the non-federated multi-function exciter as shown in FIG. 3 in accordance with at least one embodiment.

FIG. 4 is a more refined system block diagram of NFME 100 further illustrating for at least one embodiment the components of the transmission subsystem 104, the communication modulation subsystem 106 and the reference clock subsystem 108.

More specifically, the output of the DDS waveform generator 300 is directed through to a mixer 400 which combines the signals received (e.g., the output of the DDS waveform generator 300 and the divided output provided from the reference subsystem 108) and generates an RF output signal within a baseband frequency range of about 118 MHz~291 MHz. For radar format the output signal is permitted to vary, whereas for communication format it may be selected to a pre-determined low spurious fixed frequency signal.

This RF output from mixer 400 is directed through a phase detector 402, a loop filter 404, a voltage controllable oscillator 406 and one or more frequency divider circuits 408 (e.g., divide by 2), 410 (e.g., divide by 8). Collectively, these elements provide the Ku-band PLL 112. The output of the Ku-band PLL 112 is directed to yet another mixer 412 which may selectively receive a signal from the reference subsystem 108, the mixed output being provided to a splitter 414 directing to a receiver and through yet another mixer 416 to the transmission amp. The additional mixer 416 is coupled to a switch 418 so as to permit blanking of the transmitter or receipt of a signal from the communication modulation subsystem 106.

The reference subsystem 108 in at least one embodiment is fundamentally based upon an oscillator, and more specifically a crystal oscillator 420. The output of the oscillator may be divided by a frequency divider 422 to a desired frequency and directed through a phase detector 424, a loop filter 426, a voltage controllable oscillator 428, and one or more frequency divider circuits 430 (e.g., divide by 32).

This reference signal is then passed through additional splitters 434, 435, frequency divider circuits 436 (e.g., divide by 4), 438 (e.g., divide by 2), one or more frequency multiplier circuits 440 (e.g., multiply by 2), mixers 442, 444 and splitters 446, 448, 450 to provide the appropriate reference signals as desired for the waveform generation subsystem 102, the transmission subsystem 104 and the communication modulation subsystem 106.

The communication modulation subsystem 106 receives input from the reference subsystem 108 in the form of two signals 310, 312. Signal 312 is passed through a splitter 470 and passed to frequency divider 472 (e.g., divide by 48) to become the reference for the phase lock loop as provided by a phase detector 474, a loop filter 476, and a voltage controllable oscillator 478. Signal 310 is a passed to a mixer 480 which receives input from the voltage controllable oscillator 478, and provides output to an adjustable frequency divider 482 which is in turn input to the phase detector 474. The adjustable frequency divider 482 is programmable and provides channel selection.

The output of the loop is provided to a splitter 484 with one output directed to an option receiver for channel selection during receive. The other signal path goes through switch 486. When operating in radar mode, the switch is set to a load 488 so as to defeat the signal. When operating in communication mode the switch provides the signal to a mixer 490 which also receives the modulated carrier with communication information as provided by the modulator 492, which receives the communication information desired for transmission.

When in radar mode, the transmission subsystem 104 receives linear and non-linear phase modulated signals via the waveform generator 102, which are upconverted, filtered and input to mixers 412 and 416. In radar mode, the local oscillator signal to mixer 416 comes from the reference subsystem 108. In the communication mode, the waveform generator 102 is tuned to a spur free fixed frequency and the upconverted and phase encoded signal input to mixer 416 is from the communication modulation subsystem 106. The tuning of the waveform generator 102 to a spur free fixed frequency eliminates DDS spurs from degrading the communications signal.

Whereas the above discussion and figures relate to an embodiment of NFME 100 operable to interleave transmission signals for transmission, in at least one alternative embodiment, NFME 100 includes components for reception as well. Such an embodiment is set forth in FIG. 4.

Figure 5:
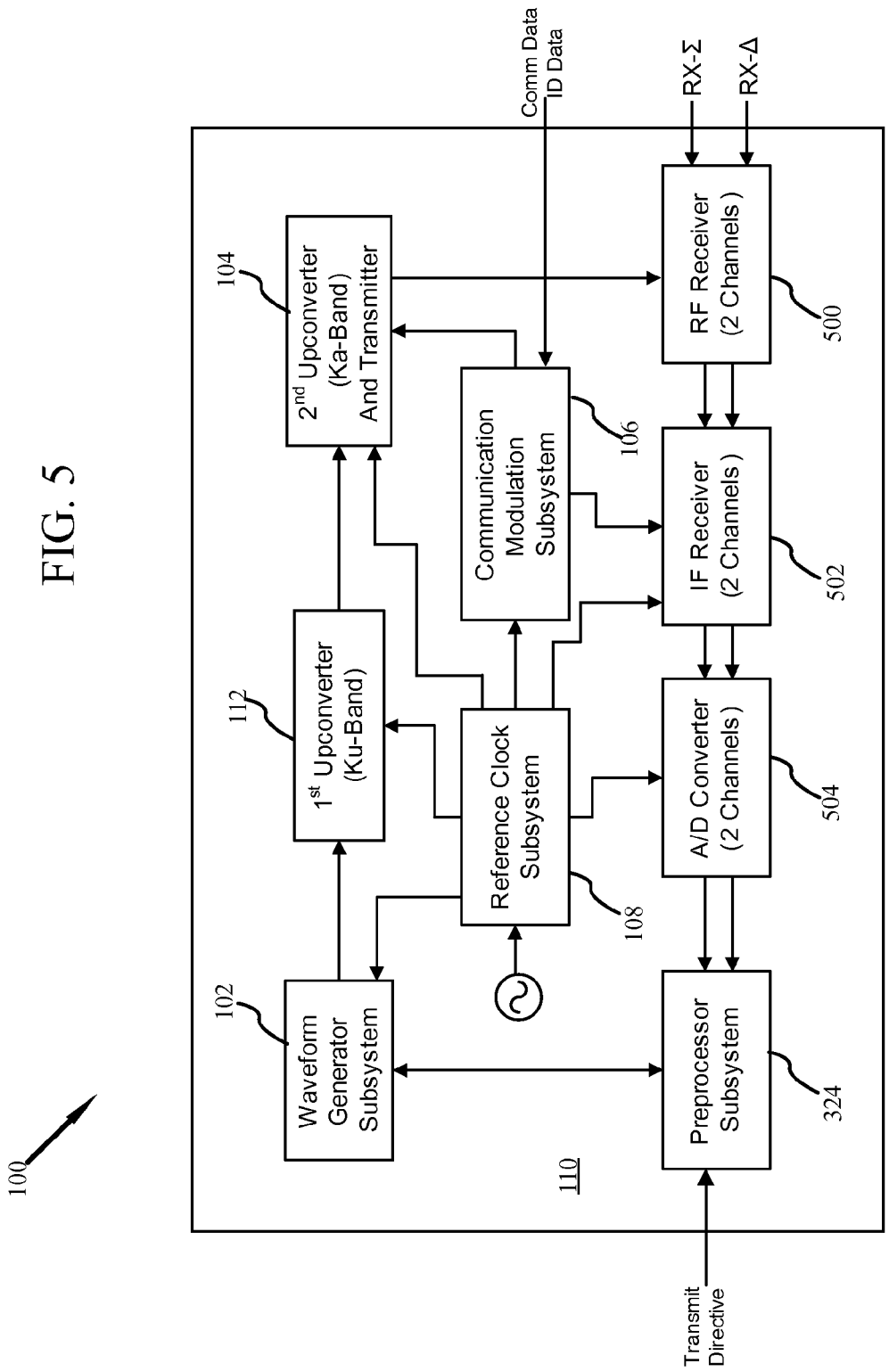
FIG. 5 presents at least one alternative embodiment for a non-federated multi-function exciter as shown in FIG. 1 further including receiver components in accordance with at least one embodiment.

More specifically, in at least one embodiment as shown in FIG. 5, NFME 100 includes an RF receiver 500 coupled to the transmission subsystem 104. The RF receiver 500 is coupled to an intermediate frequency (IF) receiver 502. The IF receiver 502 is coupled to the reference clock subsystem 108 and the communication modulation subsystem 106 so as to be properly synchronized and modulated for the extraction of information from the received signal.

The output of the IF receiver 502 is coupled to an analog to digital (A/D) converter 504, which in turn is coupled to the preprocessor subsystem 324.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall there between.

What is claimed is:

1. A non-federated multi-function exciter, comprising:
 a waveform generator subsystem operable to provide waveforms programmable in time, duration, slope and frequency;
 a transmission subsystem coupled to the waveform generator, the transmission subsystem having a first upconverter and a second upconverter coupled to the first upconverter;
 a communication modulation subsystem coupled to the second upconverter of the transmission subsystem; and
 a reference clock subsystem coupled to the waveform generator subsystem, the transmission subsystem and the communication modulation subsystem,
 wherein the first upconverter and the second upconverter are operable to generate an interleaved signal comprising a radar signal and a communication signal, and
 wherein the transmission subs stem is configured to transmit only the radar signal during a first time period and to transmit only the communication signal during a second time period that is different from the first time period.

2. The non-federated multi-function exciter of claim 1, wherein the communication signals are selected from the group consisting of data information and identification information.

3. The non-federated multi-function exciter of claim 2, wherein the identification information is combat identification information.

4. The non-federated multi-function exciter of claim 1, wherein the first upconverter is a Ku-band PLL subsystem.

5. The non-federated multi-function exciter of claim 4, wherein the Ku-band PLL subsystem is operable as an active filter, a waveform stretcher, and an upconverter.

6. The non-federated multi-function exciter of claim 1, wherein the communication modulation subsystem includes a quad-phase shift key modulator.

7. The non-federated multi-function exciter of claim 6, wherein the quad-phase shift key modulator is operable to provide bi-phase modulation.

8. The non-federated multi-function exciter of claim 1, wherein the waveform generator subsystem is a direct digital synthesis waveform generator.

9. The non-federated multi-function exciter of claim 1, wherein the waveform generator subsystem, the transmission subsystem, the communication modulation subsystem and the reference clock subsystem are disposed as a single circuit card assembly.

10. The non-federated multi-function exciter of claim 1, further including:
an RF receiver coupled to the transmission subsystem;
an IF receiver coupled to the RF receiver, the communication modulation subsystem and the reference clock subsystem; and
an A/D converter coupled to the IF receiver and the reference clock subsystem.

11. The non-federated multi-function exciter of claim 1, wherein the exciter is operable in a first instance of radar format to:
generate an oscillating reference waveform using the waveform generator subsystem;
upconvert, and stretch the oscillating reference waveform to a Ku-band waveform using the first upconverter; and
upconvert the Ku-band waveform to a Ka-band waveform using the second upconverter, and transmit the generated Ka-band waveform as a radar signal.

12. The non-federated multi-function exciter of claim 1, wherein the exciter is operable in a second instance of communication format to:
park the waveform generator subsystem at a predetermined frequency to generate a low spurious content fixed frequency signal;
upconvert the fixed frequency signal to a fixed frequency Ku-band signal using the first upconverter;
modulate received communication information (X band);
upconvert the modulated communication information with the fixed frequency Ku-band signal using a second upconverter to a modulated Ka-band signal; and
transmit the modulated Ka-band signal as a pulse of communication data.

13. A method of generating interleaved radar and communication signals using a non-federated multi-function exciter, comprising:
determining a transmission operation to be in a first instance a radar format and in a second instance to be a communication format;
in the first instance of the radar format:
generating an oscillating reference waveform using a waveform generator;
upconverting the oscillating reference waveform to a Ku-band waveform using a Ku-band PLL, subsystem; and
upconverting the Ku-band waveform to a Ka-band waveform using a transmission subsystem, and transmitting the generated Ka-band waveform as a radar signal;
in the second instance of the communication format:
parking the waveform generator at a predetermined frequency to generate a fixed frequency signal;
upconverting the fixed frequency signal to a fixed frequency Ku-band signal using a Ku-band PLL subsystem;
modulating received communication information using a communication modulation subsystem;
upconverting the modulated communication information with the fixed frequency Ku-band signal using a transmission subsystem to a modulated Ka-band signal; and
transmitting the modulated Ka-band signal as a pulse of communication data.

14. The method of claim 13, wherein the communication information is identification information, datalink information, or digital voice communications.

15. The method of claim 13, wherein radar signals and communication data are interleaved in real time.

16. The method of claim 13, wherein the waveform generator is a direct digital synthesis waveform generator.

17. The method of claim 13, wherein the waveform generator is further operable to generate timing and control functions for the transmission subsystem and the communication modulation subsystem.

18. The method of claim 13, wherein the method is performed by components upon a circuit board supporting and interconnecting a waveform generator subsystem, a transmission subsystem, a communication modulation subsystem and a reference clock subsystem.

19. A circuit card assembly, comprising:
a waveform generator subsystem operable to provide waveforms programmable in duration, slope and frequency;
a transmission subsystem coupled to the waveform generator subsystem, the transmission subsystem having a first upconverter and a second upconverter coupled to the first upconverter;
a communication modulation subsystem coupled to the second upconverter of the transmission subsystem; and
a reference clock subsystem coupled to the waveform generator subsystem, the transmission subsystem and the communication modulation subsystem,
wherein the circuit card assembly is operable as a non-federated multi-function exciter, and
wherein the first upconverter and the second upconverter are operable to generate an interleaved signal comprising a radar signal and a communication signal, and
wherein the transmission subsystem is configured to transmit only the radar signal during a first time period and to transmit only the communication signal during a second time period that is different from the first time period.

20. The circuit card assembly of claim 19, wherein the circuit card assembly is operable in a first instance of radar format to:
generate an oscillating reference waveform using the waveform generator subsystem;
upconvert the oscillating reference waveform to a Ku-band waveform using the first upconverter;
upconvert the Ku-band waveform to a Ka-band waveform using the second upconverter; and
transmit the generated Ka-band waveform as a radar signal.

21. The circuit card assembly of claim 19, wherein the circuit card assembly is operable in a second instance of communication format to:
park the waveform generator subsystem at a predetermined frequency to generate a fixed frequency signal;
upconvert the fixed frequency signal to a fixed frequency Ku-band signal using the first upconverter;
modulate received communication information (X band);
upconvert the modulated communication information with the fixed frequency Ku-band signal using the second upconverter to a modulated Ka-band signal; and
transmit the modulated Ka-band signal as a pulse of communication data.

* * * * *